Figure 1:
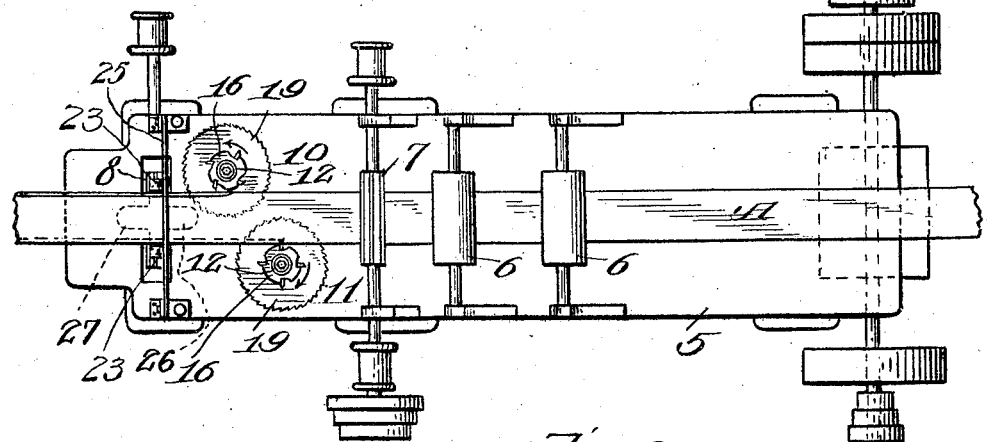

W. A. PERKINS.
PLANING MACHINE AND ATTACHMENTS.
APPLICATION FILED APR. 23, 1910.

987,012.

Patented Mar. 14, 1911.

2 SHEETS—SHEET 1.

Witnesses:
J. J. McCarthy
S. E. White

Inventor
William A. Perkins
By Chas. S. Hyer
Atty.

W. A. PERKINS.
PLANING MACHINE AND ATTACHMENTS.
APPLICATION FILED APR. 23, 1910.
987,012.
Patented Mar. 14, 1911.
2 SHEETS—SHEET 2.
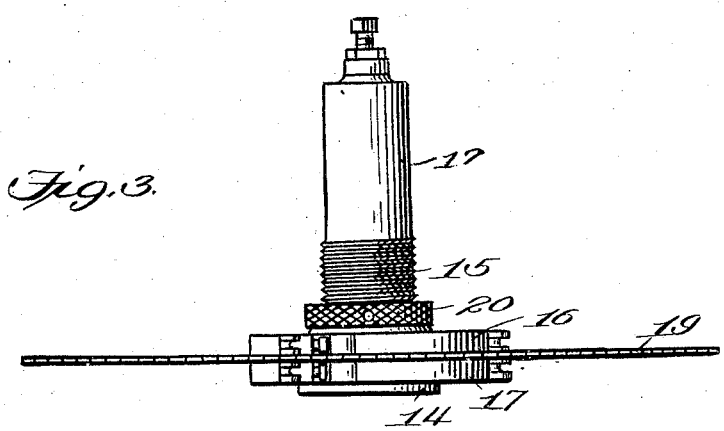
Fig. 3.
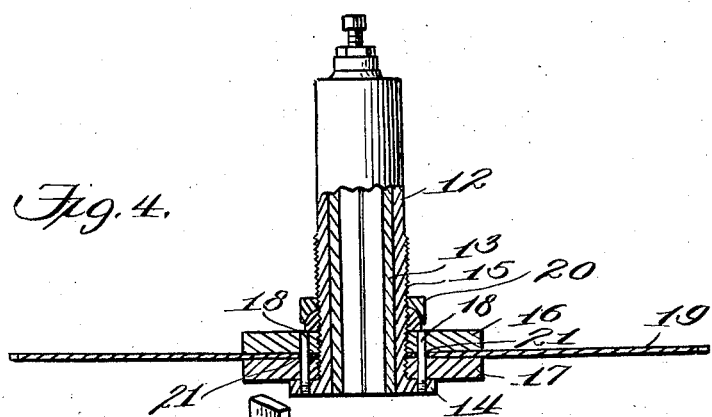
Fig. 4.
Fig. 5.
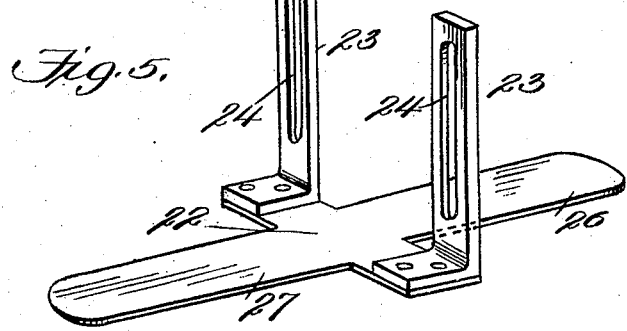
Witnesses:
J. J. McCarthy
J. E. White
Inventor
William A. Perkins
By
Chas. S. Hyer
Atty.

UNITED STATES PATENT OFFICE.

WILLIAM A. PERKINS, OF BALTIMORE, MARYLAND, ASSIGNOR OF ONE-HALF TO JOSEPH D. VIRDIN, OF BALTIMORE, MARYLAND.

PLANING-MACHINE AND ATTACHMENT.

987,012.   Specification of Letters Patent.   Patented Mar. 14, 1911.

Application filed April 23, 1910. Serial No. 557,193.

*To all whom it may concern:*

Be it known that I, WILLIAM A. PERKINS, a citizen of the United States, residing at Baltimore, Maryland, have invented certain new and useful Improvements in Planing-Machines and Attachments, of which the following is a specification.

This invention relates to lumber dressing machines or planers and particularly to side head attachments for cutting strips of material and at the same time forming tongues and grooves in opposite side edges of the strips in relative positions so that the tongues may be fitted into the grooves to produce a covering for various purposes. The attachments and the machine embodying the same are not confined to the production of a finished strip for any specific use, as it is proposed to use the strips for any purpose to which they may be applicable. The machine embodying the attachments, however, is advantageous in the formation of "ceiling" or ceiling strips, and in the subjoined description this particular class of strips may be referred to exclusively simply for the purpose of demonstrating the practical operation of the machine and its attachments, though it is obvious that no restriction is intended to be understood by such special reference.

The primary object of the invention is to economize in the production of building material both as to the quantity of lumber required and the time necessary in completing the desired product.

The invention consists essentially of a side head embodying a circular saw disposed between two cutters or cutting heads which may be constructed either for the formation of edge grooves of for edge tongues, the saw having such diameter relatively to the cutters or cutting heads as to horizontally and evenly cut a strip of lumber or stock completely therethrough and at the same time form a tongue or groove in the adjacent edge of each strip without requiring separate operations to obtain the same result. It is preferred that two of the side heads be used in each machine, one in advance of the other, and that the machine have planing or dressing devices for finishing the upper and lower surfaces of the material or stock simultaneously with the operation of separating the material or stock by the side heads so that the strips when issuing from the machine will be completed and ready for use. It is also proposed to employ a combined spreader and pressure device to engage the cut strips for the purpose of separating them and rendering the saws effective in their operation and also for forcing the lower strip downwardly in contact with a lower cutter or finishing head or planer attachment.

The invention also consists in the details of construction and arrangement of the several parts which will be more fully hereinafter described and claimed.

Figure 2:
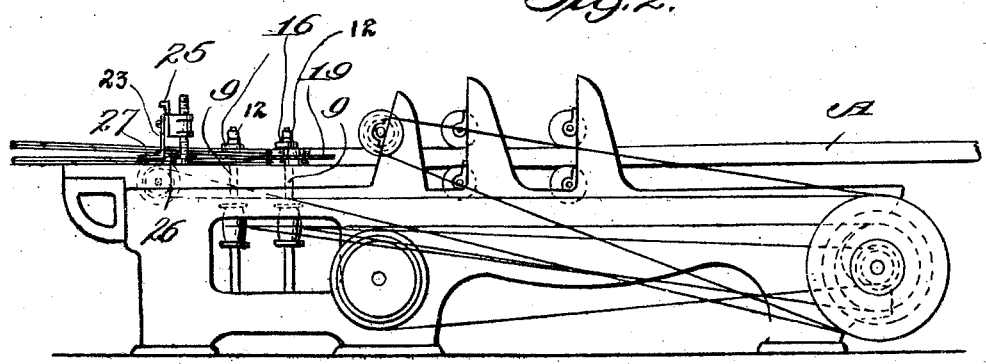

In the drawings: Figure 1 is a top plan view of the planing machine showing the improved side heads attached thereto and disposed in relative positions for operation upon a strip of material or stock. Fig. 2 is a side elevation of the machine as shown by Fig. 1 and particularly illustrating the material or stock as being formed into strips and issuing in finished condition from the machine. Fig. 3 is a detail side elevation of one of the side head attachments. Fig. 4 is a partial section through one of the side head attachments and particularly showing the manner of disposing the circular saw between the two cutters or cutting heads. Fig. 5 is a detail perspective view of the combined spreader and clamp.

The numeral 5 designates a planing or lumber dressing machine of any preferred type, but at least embodying feed rollers 6, a top planer 7 consisting of any well known form of rotary cutter, and a lower planer or cutter 8. Rising from suitable rotatable spindles at opposite sides of the longitudinal center of the bed of the machine 5 are rotatable spindles 9 on which side head attachments 10 and 11 are operatively disposed and embody features of the invention. The feed rollers 6, planers or cutters 7 and 8, and side head attachments 10 and 11 are all driven by the usual belts and pulleys, as indicated by Fig. 2, and as said mechanisms are well understood in the art to which they pertain it is unnecessary to specifically refer to the same.

Each side head attachment comprises a tubular post 12 in which is fitted a split bushing 13. The lower end of the post 12 is formed with a foot flange 14, and above this flange screw-threads 15 are cut in the outer surface of the post. A pair of cutters or cutting heads 16 and 17 are fitted over the post 12 and engage the screw-threads 15, the lower cutter or cutting head 17 tightly bearing against the foot flange 14. Dowel pins 18 project upwardly from the flange 14 and extend through suitable openings in the cutters or cutting heads 16 and 17, and between the two cutters or cutting heads a circular saw 19 is interposed and of materially greater diameter than the said cutters or heads 16 and 17. The dowel pins 18 also extend through the saw 19 and hold the latter against movement on the post 12 independently of the cutters or cutting heads, and after the said cutting heads and saw have been assembled, as particularly shown by Fig. 4, they are secured by a ring 20 also engaging the screw-threads 15. In applying the saw 19 it is unnecessary to particularly prepare the same for disposal between the cutters or cutting heads 16 and 17, as saws now found in the market have a central arbor or spindle opening and other smaller openings to engage pins or studs for holding the saw in fixed position on the arbor or spindle. The dowel pins 18 are so disposed as to engage the smaller openings as at 21 in the saw, and by this means convenience in assemblage of the saw with relation to the cutters or cutting heads 16 and 17 ensues.

It will be understood that when the post 12 with the bushing 13 therein is inserted over one of the spindles 9 of the machine 5, a tight frictional engagement will be set up so as to insure a regular rotation of the side head attachment complete with the spindle 9.

The invention also contemplates the use of the combined spreader and clamp attachment, as shown in detail by Fig. 5. This attachment consists of a base member 22 having arms 23 rising from opposite ends thereof and longitudinally slotted as at 24 to receive fastening devices carried by the frame yoke 25 of the machine adjacent to or over the lower planer or dresser 8, the entire attachment, as shown by Fig. 5, being vertically adjustable to obtain the necessary clamping pressure on the work and also removable from the yoke 25. As shown in the accompanying drawings the upright arms 23 are made separate from the base member 22 and are L-shaped, being riveted or otherwise rigidly secured to said base member 22 as clearly shown in Fig. 5. The attachment may be readily applied and adjusted to the work, as it is of comparatively light structure. Projecting in opposite directions from the center of the base member 22 is a spreader tongue 26 and a presser tongue 27. The spreader tongue 26 is projected inwardly in the direction of the side head attachments 10 and 11 and fits between the strips as they are cut by the saws of the said attachments to hold the said strips spread a sufficient distance to prevent binding on the saws and ease the operation of the latter. The lower strip as cut from the material or stock passes under the base member 22 and is engaged by said base member and the presser tongue 27 thereof and the lower side of the said strip is thereby firmly held down by said base member and presser tongue against the cutter or planer 8 which finishes or planes the under side of said strip, the upper side of the top strip or of the stock or material as it is fed to the side head attachments being dressed or planed by the cutter or planer 7.

In the operation of the machine the stock or material to be cut is fed inwardly over the end of the machine as indicated by A, Figs. 1 and 2, and passes through the feeding rollers 6 under the cutter or planter 7 and is horizontally split or cut by the side head attachments 10 and 11 and passes downwardly under the yoke 25, the lower strip moving under the base member 22 of the combined spreading and clamping attachment shown by Fig. 5 and engaged by the base member and the tongue 27 thereof which holds the under side of said lower strip in close contact with the cutter or planer 8, as hereinbefore indicated. The upper strip passes between the arms 23 and both strips, through the operation of the side head attachments 10 and 11, have their opposite edges formed with tongues and grooves, the tongues being regularly produced by one side head attachment in the adjacent edges of the strips as cut, and the grooves being formed by the other side head attachment in the edges of the strips nearest thereto. By means of the attachments as explained, material or stock of various thicknesses may be centrally cut in a horizontal plane and in forming ceiling the material or stock having a thickness of one inch may be cut to produce strips of one-half inch thickness or even less, in accordance with the primary thickness of the stock or material fed into the machine. A great saving in time and labor results by reason of the complete work on the strips being performed at one operation. In some instances it may be necessary to use only one side head attachment, and in such event the machine will work equally well.

Though the preferred form of the side head attachment and combined spreader and clamping or pressure means has been described, it will be understood that changes in the proportions, dimensions and minor details of construction may be resorted to without departing from the spirit of the invention.

What is claimed is:

1. In a wood working machine, the combination with a bed, saws mounted therein arranged to divide a board horizontally, and planing cutters arranged to act on opposite sides of the board, of a combined spreader and clamp comprising a base member adapted and arranged to clamp the lower section of the divided board, and a forwardly extended spreader tongue coöperating with the saws, slotted upright arms rigidly secured to the base member, a yoke secured to the machine bed and means for securing said slotted arms to said yoke with the spreader tongue and base member in position for performing their functions.

2. In a wood working machine, the combination with a bed, saws mounted therein arranged to divide a board horizontally, and planing cutters arranged to act on opposite sides of the board, one on the upper surface before it is divided and the other on the lower surface after division, of a combined spreader and clamp comprising a base member having a longitudinal forwardly extended spreader tongue coöperating with the saws and a rearwardly extended presser tongue, the base member and rearwardly extended presser tongue coöperating with the last mentioned planing cutter, slotted upright arms rigidly secured to said base member, a yoke secured to the machine bed, and means for securing said slotted arms to said yoke with the spreader tongue, presser tongue and base member in position for performing their functions.

In testimony whereof I have hereunto set my hand in presence of two subscribing witnesses.

WILLIAM A. PERKINS.

Witnesses:
 ALBERT W. CLARK,
 D. M. WOLF.

---

Copies of this patent may be obtained for five cents each, by addressing the "Commissioner of Patents, Washington, D. C."